United States Patent
Khrenov et al.

[15] 3,697,914
[45] Oct. 10, 1972

[54] MULTITURN INDUCTOR FOR MAGNETIC-PULSE TREATMENT OF TUBULAR MEMBERS

[72] Inventors: Konstantin Konstantinovich Khrenov; Vyacheslav Andreevich Chudakov, both of Kiev, U.S.S.R.

[73] Assignee: Institut Elektrosvarki imeni E.O. Patona, Akademii Nauk USSR, Kiev, U.S.S.R.

[22] Filed: July 14, 1971

[21] Appl. No.: 162,422

[52] U.S. Cl. ................................... 336/62, 336/223
[51] Int. Cl. ............................................. H01f 27/08
[58] Field of Search .................... 336/62, 58, 55, 223

[56] References Cited
UNITED STATES PATENTS

| | | |
|---|---|---|
| 2,571,872 | 10/1951 | Hayes ........................ 336/62 |
| 2,128,086 | 8/1938 | Glakle ........................ 336/62 |
| 3,299,383 | 1/1967 | Conner et al. ............ 336/62 X |
| 2,715,170 | 8/1955 | Sorensen ................. 336/62 X |

*Primary Examiner*—Thomas J. Kozma
*Attorney*—Holman & Stern

[57] ABSTRACT

In the turns of a multiturn inductor for magnetic pulse treatment of tubular members inductor there is provided a channel having along its entire length a narrow passage for passing a coolant and a wide portion for placing therein a metal band. Laid on the band is a layer of an elastic sealing material having adhesive properties.

4 Claims, 3 Drawing Figures

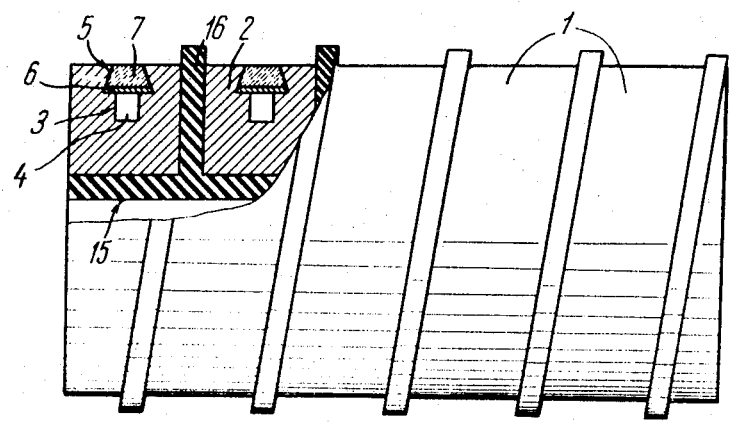
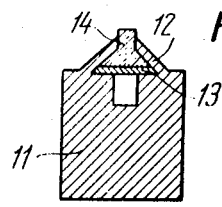
FIG. 1
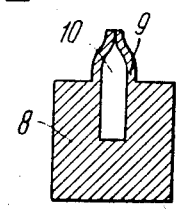
FIG. 3
FIG. 2

MULTITURN INDUCTOR FOR MAGNETIC-PULSE TREATMENT OF TUBULAR MEMBERS

The present invention relates to equipment for magnetic-pulse treatment and, more particularly, the invention relates to multiturn inductors for mangetic-pulse welding and pressure working of tubular members.

Well known in the art is a multiturn inductor for magnetic-pulse welding and pressure working of tubular members. The inductor turns are provided with a channel which along its whole length has a relatively narrow portion for passing a coolant and a relatively wide portion in which there is placed a metal band to prevent leakage of the coolant.

In the known inductors the sealing metal band is welded to the walls of the channel.

In the process of magnetic-pulse welding and pressure treatment of members a helical inductor is subject to high electromagnetic stresses which appear due to the action of the axial and radial forces on the inductor. The axial force tends to reduce the distance between the turns, whereas the radial force tends to increase the diameter of the turns. Therefore, the cooling system of the inductor must meet the following requirements:

quick and effective removal of heat in the process of welding;

high mechanical strength and elasticity of the metal band in the place of its connection with the channel;

long life and reliability of connection of the band with the channel walls.

In known inductors in the process of operation the band comes off from the walls causing a leakage of coolant, thus adversely affecting normal and reliable operation of the inductor.

A specific object of the invention is to provide a multiturn inductor which would provide for quick and efficient removal of heat in the process of the inductor operation.

Another object of the invention is to provide a multiturn inductor having high mechanical strength and reliability of connection of the metal band with the channel walls.

These and other objects are attained by providing a multiturn inductor for magnetic-pulse treatment of tubular members having a channel whose length is equal to that of the turns. The channel along its entire length comprises a passage relatively narrow in cross section for passing a coolant and a wider portion in which there is placed a metal band aiding preventing leakage of the coolant. According to the invention, the metal band is provided with a tightly laid layer of a sealing material securing the band to the walls of the channels.

The relatively wide portion of the channel is preferably so made that it is dovetailed in a cross section to prevent the sealing material from moving from the channel.

The inductor turns may be provided with flanged projections between which there is placed an elastic sealing material laid on the band, the ends of the projections being crimped for tightening the sealing material.

Furthermore, the ends of the projections may be so connected as to provide a free space therebetween for passing the coolant.

BRIEF DESCRIPTION OF DRAWINGS

Other objects and advantages of the invention will be apparent from the following detailed description of exemplary embodiments of the invention, reference being made to the accompanying drawings, in which:

FIG. 1 shows a general view of the multiturn inductor, partly in section, illustrating a longitudinal section of the indictor turns with a channel for passing a coolant;

FIG. 2 is one modification of the channel;

FIG. 3 is another modification of the channel.

The turns 1 (FIG. 1) of the multiturn inductor are formed along a helical line. Made in the body 2 of the inductor also along a helical line is a channel having a length equal to that of the turns 1 and used for cooling the inductor turns during their operation. The channel 3 has a relatively narrow passage 4 for passing a coolant and a relatively wide portion 5 accomodating a metal band 6 for assisting preventing leakage of the coolant, both portions being made along the entire length of the channel. Liquid tightness of the passage 4 is ensured by a layer of sealing material 7 laid on the band 6 and having elastic and adhesive properties.

To prevent the sealing material 7 from coming off the channel 3 and for tightly laying the layer of this material, the wide portion 5 of the cross section of the channel 3 is dovetailed. Such a shape makes it possible to reliably "lock" the sealing material and seal the coolant within the channel 3.

One modification of the above arrangement in the channel 3 has a construction shown in FIG. 2, in which the turns 8 of the inductor have in their upper portion flanged projections 9 whose ends are welded or soldered so that a free space 10 is formed therebetween which is a channel for passing the coolant.

However the welding (soldering) of the ends of the projections 9 of the turns 8 is not always suitable for the inductors operating under heavy loads due to the deterioration of the chemical and physical properties of the metal of the inductor caused by the heating during the welding (soldering). Hence, such inductors often need a channel with a passage therein sealed without heating the inductor turns. For this purpose the turns 11 (FIG. 3) of the inductor are also provided with flanged projections 12, between which on the metal band 13 is laid a sealing material in the form of a rubber sealing means 14, while the ends of the projections 12 are subsequently crimped to provide for tight "locking" of the channel. This crimping of the ends of the projections 12 makes it possible to provide for a "dovetailed" construction, in which the rubber sealing means 14 tightens the channel effectively, and the higher the liquid pressure within the channel, the better the sealing.

To reduce leakage of electric current through the coolant and to eliminate electric breakdown through the coolant, the latter is preferably supplied through a vacuum hose, having a small diameter (4–6 mm) and wound into a coil, to the positive terminal of the inductor, in which case the other end of the hose is fastened to the negative terminal of the inductor, i.e. to earth. The coolant is withdrawn through a conventional hose.

The use of such a cooling system makes it possible to considerably increase the inductance of the cooling system and to eliminate the leakage of electric current to earth through the coolant which may be water. The low inner section of the hose offers a considerable electric resistance to the electric current of the inductor.

Besides mechanical strength, the inductors must have high-quality interturn insulation. The power (W) of the magnetic-pulse installation is determined as W = $CV^2/2$ which, as seen from the formula, is determined by two parameters: capacitance (C) and voltage (V). Electric power is most effectively controlled by voltage. Therefore, to provide a high input power the voltage applied to the operating unit or inductor is high: up to thousands and tens of thousands volts.

The insulation of the turns of the inductor by means of polyethylene, polystyrene and other films as well as the use of synthetic resins (epoxy resins) with or without a filler as an insulating compound do not provide for reliable resistance against long-term dynamic loads.

In the course of its being subjected to dynamic loads the inductor is affected by two forces: a radial force tending to increase the diameter of the inductor turns and an axial force tending to reduce the length of the inductor. The interturn insulation of the inductor is subject to the action of the same forces.

Hence, the interturn insulation must have adequate mechanical strength, a high wear resistance and a high electric strength.

The interturn insulation is preferably made in the form of a screw member 15 (FIG. 1) with ribs 16 introduced into the inductor, in which case the ribs 16 of the screw member 15 project above the turns 1 of the inductor. In this case said insulation makes it possible to maintain a reliable performance of the inductor during a long period of time. The screw member may be made, for example, of fluoplastic, polyethylene, "-kapron".

The proposed invention makes it possible to provide for a multiturn inductor having a high mechanical strength and long service life and also featuring quick and efficient removal of heat during the operation.

We claim:

1. A multiturn helical inductor for magnetic-pulse treatment of tubular members comprising in combination: a substantially helical channel having a length equal to that of the inductor turns and having along its entire length a relatively narrow passage and a relatively wide portion as viewed in a cross-section, said relatively narrow passage being used for passing a coolant; a metal band for aiding preventing leakage of the coolant and placed within said relatively wide portion of the channel; and a layer of elastic sealing material tightly laid onto said metal band and to adhere to the walls of the channel.

2. A multiturn inductor as stated in Claim 1, in which said relatively wide portion of the channel is of dovetailed cross section to prevent the sealing material from coming off from the channel.

3. A multiturn inductor as stated in claim 1, in which the turns of the inductor have flanged projections between which said elastic sealing material is laid onto said band, the ends of the projections being squeezed for securing the elastic sealing material.

4. A multiturn helical inductor for magnetic-pulse treatment of tubular members comprising: a helical conductor forming the inductor; a coolant-passage formed in the cross-section of said conductor along the entire helical length; and flanges projecting from a cross-section of the helical conductor, integral with the conductor and thinner than a minimum cross-sectional dimension of the conductor, said flanges being sealingly joined at their free ends so as to form part of the cross-section of said coolant passage.

* * * * *